(No Model.)

H. G. BOSWELL.
VACUUM PAN.

No. 604,598.  Patented May 24, 1898.

WITNESSES:
William P. Goebel
Theo. G. Hoster

INVENTOR
H. G. Boswell
BY
ATTORNEYS.

UNITED STATES PATENT OFFICE.

HENRY GEORGE BOSWELL, OF LIHUE, HAWAII.

VACUUM-PAN.

SPECIFICATION forming part of Letters Patent No. 604,598, dated May 24, 1898.

Application filed June 8, 1897. Serial No. 639,857. (No model.)

*To all whom it may concern:*

Be it known that I, HENRY GEORGE BOSWELL, of Lihue, Kauai, Hawaii, have invented new and useful Improvements in Vacuum-Pans, of which the following is a full, clear, and exact description.

The invention relates to sugar-making; and its object is to provide certain new and useful improvements in vacuum-pans whereby the liquids carried by the vapors in the generating-pan are readily separated from the vapors and the latter are not deflected in the pan or obstructed in their passage from the pan to the condenser.

The invention consists in certain features of construction, as will be fully described hereinafter and defined in the claim.

Reference is to be had to the accompanying drawings, forming a part of this specification, in which similar characters of reference indicate corresponding parts in both figures.

Figure 1:
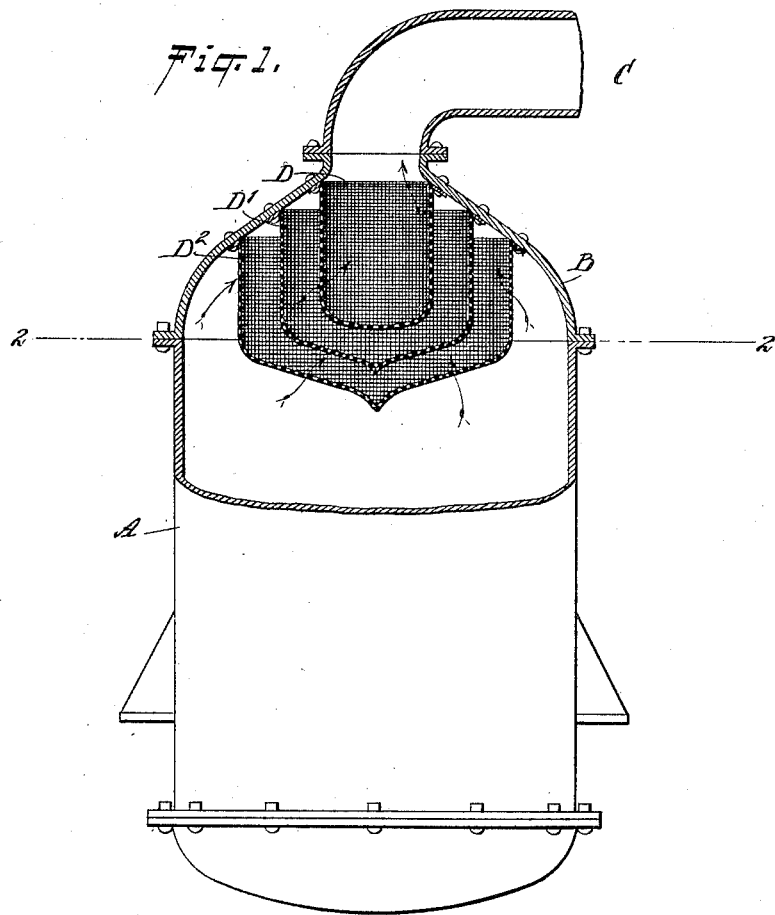
Figure 2:
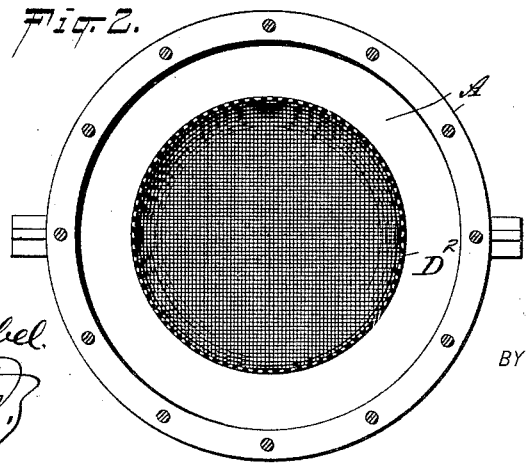

Figure 1 is a sectional side elevation of the improvement, and Fig. 2 is a sectional plan view of the same on the line 2 2 of Fig. 1.

The generating-pan A, of the usual construction, is provided with a dome B, from which leads the pipe C to the condenser. In the pan A extend one or more screens D D' D², preferably in basket or cup shape, and with their open edges attached to the inside of the dome B, as plainly shown in Fig. 1, so that all the vapors passing from the pan A to the condenser must pass through the sieves or screens D² D' D. As shown, these sieves or screens are located one within the other, but with their walls suitable distances apart, so that the vapors must pass first through one screen and then to the next following one, and so on, before they finally reach the pipe C. Owing to the narrowness of the sieve-openings and the slow motion of the vapors the liquid particles carried by the vapors readily attach themselves to the sieves, and once attached, and thereby interrupted in their movement toward the condenser, accumulate in quantities sufficient to form drops, which finally drain back into the boiling liquid contained in the pan A.

It is expressly understood that the vapors are not deflected, as is the case when baffle-plates are used in the vacuum-pan; but the passage of the vapors is wholly unobstructed, and only the liquid particles carried by the vapors are prevented by the sieves from passing into the pipe C and to the condenser, as above described.

By having the sieves in the form of baskets, as before mentioned and shown in the drawings, the aggregate area of the openings in the meshes of the sieve does not retard or obstruct the movement of the vapors from the pan A to the pipe C, so that the particles of the liquid that have accumulated on the sieves are not liable to be moved therefrom by the ascending vapors and carried through the sieves to the pipe C and the condenser, but, on the contrary, are free to drain back into the pan A without obstructing the movement of the vapors.

It is further understood that the particles of the liquid do not accumulate on the sieves on account of condensation, as the atmosphere of the sieves is approximately the same as that in the interior of the pan; but the closeness of the meshes in the sieves retains the particles of the liquid and allows the same to drain back into the pan.

It is further understood that any liquid particles passing through the meshes of the first screen or sieve are liable to be caught by the following screen or screens, so that the vapors are freed from the liquid particles carried by the same before reaching the condenser.

Having thus fully described my invention, I claim as new and desire to secure by Letters Patent—

A vacuum-pan having an outlet-orifice, and a plurality of depending cup-shaped screens fitting one within the other and spaced apart from each other, the screens being foraminous at the bottom and sides and arranged under the said orifice and within the vacuum-pan, whereby vapors passing from the pan will be separated from the liquids that may be suspended therein.

HENRY GEORGE BOSWELL.

Witnesses:
W. T. LUCAS,
ED ST. C. DE LACEY.